May 10, 1960  R. A. STEIN  2,935,785
METHOD OF MANUFACTURING STATORS
Filed Nov. 29, 1954  2 Sheets-Sheet 1
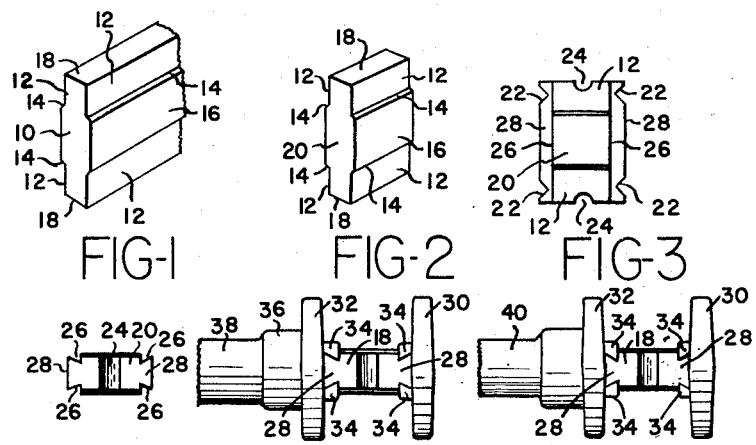
FIG-1  FIG-2  FIG-3
FIG-4  FIG-5  FIG-6
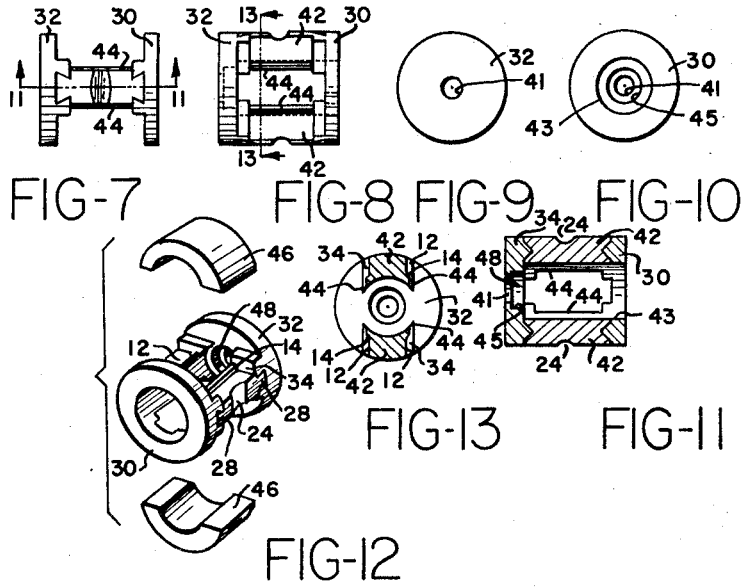
FIG-7  FIG-8  FIG-9  FIG-10
FIG-12  FIG-13  FIG-11
INVENTOR.
ROBERT A. STEIN
BY Milton E. Gilbert
ATTORNEY May 10, 1960      R. A. STEIN      2,935,785
METHOD OF MANUFACTURING STATORS
Filed Nov. 29, 1954      2 Sheets-Sheet 2
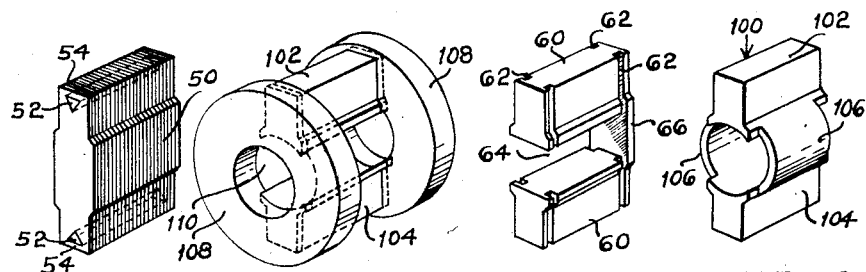
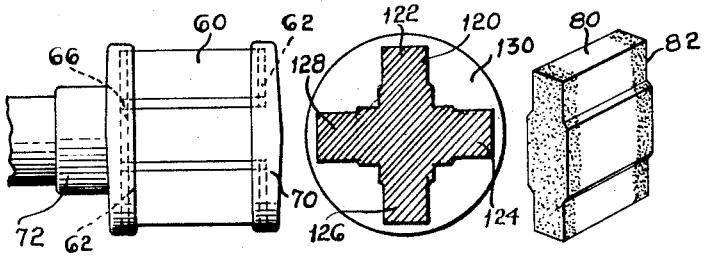
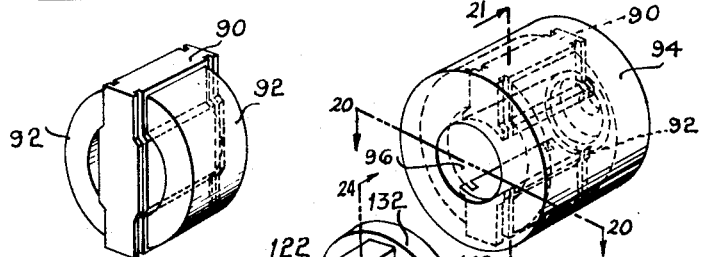
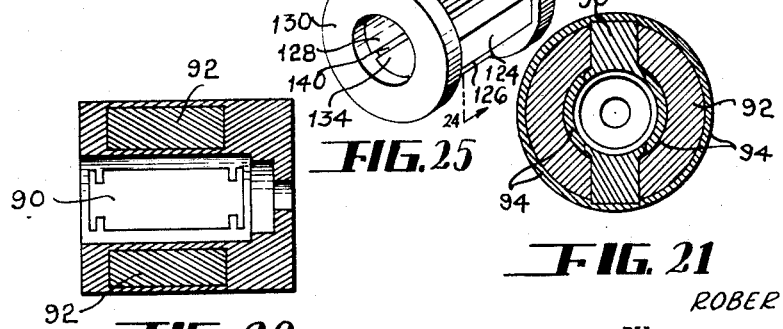
INVENTOR.
ROBERT A. STEIN
BY
HIS ATTORNEYS United States Patent Office 2,935,785
Patented May 10, 1960

2,935,785
METHOD OF MANUFACTURING STATORS

Robert A. Stein, Dayton, Ohio, assignor to Globe Industries, Inc., Dayton, Ohio, a corporation of Ohio Application November 29, 1954, Serial No. 471,560

20 Claims. (Cl. 29—155.5)

This invention relates to the manufacture of a stator and more particularly to a stator adapted for use with permanently magnetized poles, although not necessarily so limited.

This is a continuation-in-part of my copending application Serial No. 142,868, filed February 7, 1950, now abandoned, for Method of Manufacturing Stators.

The method of manufacturing a stator disclosed herein is adaptable for the manufacture of a stator for use in a motor disclosed in the Aronoff United States Letters Patent No. 2,479,455, patented August 16, 1949. In the Aronoff Patent bolts extend through the stator and the plastic mounting for the brushes, the bearings and the like.

An object of this invention is to provide a stator wherein ferrous magnetic pole pieces are fixedly attached to non-ferrous-non-magnetic end rings cast in position so that the ferrous magnetic pole pieces and the non-ferrous-non-magnetic end rings constitute one rigid stator.

Another object of this invention is to sever the two pole pieces from a bar of steel, securing the pole pieces together by casting non-ferrous-non-magnetic end rings to the ends of the pole pieces, drilling out the center from one end of the stator so as to properly center the pole faces of the two oppositely disposed pole pieces, this followed by forming a seat for the bearing in one of the end rings, the end rings being finished to the proper dimensions.

Other objects and advantages reside in the construction of parts, the combination thereof and the mode of operation, as will become more apparent from the following description.

In the drawings, Figure 1 is a fragmentary, perspective view of a bar of ferrous magnetic material.

Figure 2 is a perspective view of a piece severed from the bar shown in Figure 1.

Figure 3 is a side elevational view of the piece shown in Figure 2 after it has been machined so as to form dovetailed projections and rabbets adjacent the ends of the piece.

Figure 4 is a top plan view of the piece shown in Figure 3.

Figure 5 is a top plan view of the piece shown in Figures 3 and 4, having end rings cast in position.

Figure 6 is a view similar to Figure 5 having the sprue end finished concentric with the edges of the ferrous magnetic pole piece.

Figure 7 shows the stator after it has been trimmed and apertures bored and reamed through the center so as to form two pole pieces.

Figure 8 is another view of the stator, as viewed from the top of Figure 7.

Figure 9 is an end view as seen from the left of Figures 7 and 8.

Figure 10 is another end view as viewed from the right of Figures 7 and 8.

Figure 11 is a cross sectional view, taken substantially on the line 11—11 of Figure 7.

Figure 12 is an exploded view showing the stator in perspective and two permanent magnets ready to be dropped into position.

Figure 13 is a cross sectional view, taken substantially on the line 13—13 of Figure 8.

Figure 14 discloses a modification utilizing a stack of laminations instead of a bar.

Figure 15 discloses another modification utilizing bar stock similar to that disclosed in connection with the preferred modification, having the center punched out, to thereby reduce the amount of metal to be removed by means of a drilling operation.

Figure 16 discloses the magnetic material disclosed in Figure 15 after the metal has been cast in position.

Figure 17 discloses another modification wherein no notches are used; but a bond is secured by means of a metal plating extending over the ends of the bar stock.

Figure 18 discloses another modification with the two magnets mounted in position.

Figure 19 discloses a magnetic bar and the magnets embedded in cast metal after the center portion has been removed by a drilling operation.

Figure 20 is a longitudinal cross sectional view taken substantially on the line 20—20 of Figure 19.

Figure 21 is a transverse cross sectional view taken substantially on the line 21—21 of Figure 19.

Figure 22 discloses another modification preferably made from powdered metal.

Figure 23 discloses the piece disclosed in Figure 22 after it has been finished.

Figure 24 is a cross sectional view of the stator piece taken substantially on the line 24—24 of Figure 25 before machining operations.

Figure 25 is a perspective view of a finished stator frame carved out of the original cross.

Referring to the drawings, Figure 1 discloses a bar of ferrous magnetic material 10. This bar of steel is provided with a plurality of finished facets 12, each merging into a shoulder 14. The finished facets 12 are parallel. These parallel facets provide faces against which the parallel faces of the permanent magnets are seated in the finished motor. The center portion 16 does not have any particular finish, in that most of this will be cut away when the stator is manufactured, as will appear more fully later. The center portion need not necessarily be of steel, in that its function is merely to hold the marginal portions provided with the facets 12 and the shoulder 14 in proper spaced and aligned relation. Furthermore, the center portion could consist of a mere thin web portion, used in holding the marginal portions in proper position during the molding operation that will be described more fully later. The opposite edges 18 are parallel to each other. This bar of stock 10 comes in rather long lengths and is used for the manufacture of pole pieces in a motor.

The first step is to sever stock or a blank 20 to the proper length. After it has been cut to the proper length, it may be placed in a milling machine where the V-shaped notches 22 are cut, said notches extending across the ends of the portions that will eventually become pole pieces, and the arcuate notches 24 are cut, as shown in Figure 3. In addition thereto, the V-grooves 26 are cut, so as to form the dovetailed projections or tenons 28. It is to be noted that the V-shaped notches 22 are cut in the portion opposite the finished surfaces 12. These V-grooves may be eliminated, as will appear more fully in connection with the description of the modifications. Instead of V-grooves, any suitable recesses, openings, holes or projections could be used.

The blank 20 is then metal plated. The metal plating may consist of copper, zinc, cadmium or any other suitable plating forming a bond uniting ferrous magnetic material to non-ferrous metal.

After it has been metal coated, the blank 20, having the notches cut therein, as shown in Figures 3 and 4, is placed in a mold where the end members 30 and 32 are cast from a non-ferrous non-magnetic material, such as aluminum. These castings 30 and 32 are provided with flanges 34 seated in the V-grooves 26, so that the dovetails 28 are located in dovetailed slots found in the cast aluminum end members 30 and 32. End member 32 is provided with a cylindrical sprue-like extension 36, merging into a reduced portion 38. This reduced portion 38 is turned down in a suitable lathe, so as to provide a finished surface 40, substantially concentric and parallel to the edges or margins 18 of the blank 20.

The finished surface 40 is then placed in a chuck of a turret lathe, where the following operations are performed. The margins of end members 30 and 32 and the margin of the ferrous magnetic blank 20 are trimmed down to the size shown in Figures 7 to 10. For some purposes, the trimming of the outer surfaces may be eliminated. At the same time that this trimming operation takes place, a drill, having substantially the diameter equal to the distance between the pole pieces in the finished stator, drills out the core in the end member 30 and the blank 20. The aperture 43 formed by this drill forms two pole pieces 42, provided with the pole tips 44 that form seats for the permanent magnets 46 when these are mounted in position. After the aperture has been drilled, it is preferbaly reamed, so as to have the exact diameter required between the two faces of the poles 42. When this operation has been completed, the recess 48 in the end member 32 is formed by drilling hole 45 concentric with aperture 43. The recess 48 provides a seat for a bearing for the armature shaft. Finally, the hole 41, through which the armature shaft projects, is drilled through end member 32 (see Figure 11). The armature, as is well known to those skilled in the art, is positioned in a cavity between the pole pieces 42.

From the foregoing, it can readily be seen that the two pole pieces are made from one piece of bar stock and the pole pieces are cast in position so as to form a rigid assembly. The plating functions as a bond between the steel or ferrous magnetic material and the aluminum casting. Instead of aluminum, other metals can be used, such as bronze or brass or any other suitable non-ferrous-non-magnetic alloy. Instead of using a non-ferrous metal, a plastic material, which is non-ferrous, could be used. This results in a rigid precision made stator, wherein the parts are accurately positioned and permanently held in position.

The metal plating, such as a copper flash, although desirable for best results, may be omitted, in that the cast aluminum cooperates with the pole pieces to form a rigid structure. The copper flash merely forms a bond between the aluminum and the pole pieces, thereby giving greater strength to the assembly.

Instead of using a piece of bar stock like that disclosed in connection with the preferred embodiment, a stack of laminations 50 may be used. Each of these laminations is provided with apertures 52 which, in this particular disclosure, have been shown as substantially triangular, although these apertures could be any other suitable shape, such as round, oval, rectangular or any other desired shape. The apertures 52 have been placed near the outer margin 54 of the laminations, so that the aperture will not interfere with the magentic flux path. The apertures 52, during the molding operation, are filled with molten metal, so that the two end pieces are held together by a pair of bars of metal extending through the apertures 52 of the pole pieces. After the end members have been cast in position in a manner similar to that disclosed in the preferred embodiment, the operations as described in connection with the preferred embodiment may then be carried out, so as to provide a pair of laminated pole pieces.

Figure 15 discloses another modification wherein a bar of ferrous magnetic material 60 is provided with retaining groves 62 that may be any suitable shape. The ferro-magnetic piece 60 may be formed from powdered metal. When forming this piece 60, the two poles are held in spaced relation by a flange-like portion 66 extending across the end of the notch 64.

In Figure 16 the piece of ferrous magnetic material 60 has been cast in position. The open end of the bar of magnetic material 60 is embedded in a casting 70 and the flange 66 is embedded in a casting 72. The operations from this stage on are substantially identical to those in connection with the preferred modification, with the exception that in drilling the hole for the armature, most of the metal in the center of the piece of ferrous magnetic material 60 has already been removed, so that it is only necessary to finish the inside pole pieces and drill a hole through the flange 66. Thereafter, the operations may be identical to those in connection with the preferred embodiment.

In the preferred embodiment and the modification, dove-tailed grooves or slots are shown for interlocking the castings to the ferrous magnetic material. As described in connection with the preferred embodiment, a bond may be provided by the use of a metallic plating, such as copper plating, zinc plating or cadmium plating.

In the modification disclosed in Figure 17 no notches have been provided in the ferrous magnetic piece 80. Instead, the bond is provided by metallic plating 82 that may be confined to the ends, or the entire piece may be plated. In actual practice, the entire piece is usually plated, in that the plating, in addition to providing a bond to the casting, also provides a protective coating. In the modification disclosed in Figure 17, only the ends of the ferrous magnetic piece have been provided with a metal plating. This metal plating provides a bond between the bar and the casting that is cast on the end.

In the modification disclosed in Figures 18 to 21 inclusive, a ferrous magnetic piece 90, which may have the contour of any of the ones disclosed in the preferred embodiment, or the modifications, has mounted thereon the permanent magnets 92. After the permanent magnets are inserted in position, the entire assembly is surrounded by a casting 94. This casting may be of metal or it may be a plastic material, holding the magnets and the ferrous magnetic piece 90 in position, as shown in Figure 19. A hole 96 has been drilled into the end and through the ferrous piece 90 by substantially the same operations as disclosed in connection with the preferred embodiment. By this arrangement, the permanent magnets 92 are permanently located in position. Thus, a permanent structure is produced.

In the preferred embodiment and in the modifications disclosed herein, excepting the last modification disclosed in Figures 18 to 21, the magnets may be removed so as to permit insertion of screws through the space that is to be occupied by the magnets in assembling the frame structure to other assemblies, such as gear boxes, gyroscopes and other mechanical devices. After the screws have been inserted, leaving the space vacant for the permanent magnets, these magnets may then be placed in position.

The method of drilling a hole through the end members and the blank 20, so as to sever the blank 20 into two pole pieces, is not necessarily limited to constructions wherein the end members are cast to the blank 20 shown in Figure 2, the blank 66 in Figure 15 or the blank 106 in Figure 22, as this method may be used in arrangements wherein the end members are secured to the blank 20 by means of brazing or any other well known fastening means.

In the modification disclosed in Figure 22, a ferromagnetic piece 100, preferably made from powdered metal, is provided with a portion 102 and a portion 104 adapted to form pole pieces. These are held in fixed spaced relation by means of a pair of arcuate portions 106. These arcuate portions 106 terminate short of the ends of the pole piece portions 102 and 104, so that when the castings 108 (shown in Figure 23) are cast in position, the castings are located beyond the arcuate portions 106. A hole 110 is drilled through the center, providing a finished inner arcuate surface for the two pole pieces 102 and 104. The arcuate portions 106 are removed by means of a milling operation, or any other suitable operation for removing the arcuate portions 106 used in holding the two pole pieces 102 and 104 in fixed spaced relation during the machining operations. The removal of metal may be done by drilling or it may be machined in any other suitable manner.

In the modification disclosed in Figures 24 and 25, a ferromagnetic piece 120 is in the form of a cross, so as to have four radially extending portions 122, 124, 126 and 128. The piece 120 may be severed from bar stock or it may be formed from powdered metal. On the ends of member 120 the castings 130 and 132 are cast. After being cast, a hole 134 is formed, either through one or both of the castings 130 and 132, and the center of the cross member 120 is removed, so as to leave four separate pole pieces 122, 124, 126 and 128. A gap 140 is created between adjacent pole tips. By inserting permanent arcuate magnets, four in number, between the pole pieces 122, 124, 126 and 128, a four pole stator is provided.

From the foregoing, it may readily be seen that in the preferred embodiment and in each of the modifications the ferromagnetic material used in forming the pole pieces constitutes a unitary structure, so as to hold the pole pieces in a fixed spaced relation during the casting of the non-ferromagnetic material used in holding the pole pieces together in the finished frame structure. By providing a unitary ferromagnetic piece of material, there is no possibility of the pole pieces shifting relative positions during the casting operation.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. The method of manufacturing a stator including the steps of severing a ferrous magnetic piece adapted to form the pole pieces of the stator from a bar of ferrous magnetic material having marginally disposed parallel finished facets each merging into a bevelled portion; forming notched dovetailed tenons in the ends of said piece of ferrous magnetic material; metal plating said piece; casting non-ferrous-non-magnetic castings with the pole piece in place so as to embed the ends thereof, said castings having dovetailed slot portions surrounding said dovetailed tenons, said casting being located at the ends of said ferrous magnetic piece and extending from one end in a sprue-like portion, finishing a portion of the sprue-like extension so as to form a cylindrical surface concentric with the cylindrical surface of the finished stator; trimming the castings and the ferrous magnetic piece to the proper outer diameter; drilling a hole through one of the castings and lengthwise throughout the entire length of the ferrous magnetic piece to the approximate diameter between the pole faces, said hole extending through one of said castings and through the ferrous magnetic pole piece so as to sever the ferrous magnetic piece into two pole pieces; reaming the hole to the desired diameter forming a seat for a bearing in the other casting; and drilling a hole for the armature shaft in the center of said seat to thereby form a stator for an electric motor.

2. The method of manufacturing a stator for use in a motor provided with magnets radially positioned with respect to the armature provided with a shaft journalled in a bearing, said method including the steps of severing pole pieces from a bar of ferrous magnetic material; forming securing means near the ends of the pole pieces; casting non-ferrous-non-magnetic solid castings with the pole pieces in position so as to embed only the ends of the pole pieces in the castings, one of the castings being provided with a sprue-like extension projecting outwardly from the casting; finishing a portion of the sprue-like extension so as to form a cylindrical surface concentric with the cylindrical surface of the finished stator; mounting the finished cylindrical surface in the chuck of a turret lathe; trimming the outer diameter of the pole pieces and the castings to the desired diameter; finishing the outer faces of the castings; drilling a hole through the casting opposite the sprue-like extension, the diameter of said hole being slightly less than the diameter between the finished pole faces but greater than the thickness of the pole pieces, said hole extending between the pole piece throughout the entire length thereof; reaming the hole so as to finish the pole pieces to the desired diameter; forming a seat for the bearing in the casting having the sprue-like extension; drilling a hole for the armature shaft, said hole extending into the portion of the casting containing the sprue-like extension; and severing the sprue-like extension from the casting to thereby provide a finished stator.

3. A cast assembly for use in manufacturing a stator, said assembly including a ferrous magnetic bar provided with a plurality of finished parallel facets adjacent the margins thereof, each merging into a shoulder, the center portion of the bar being unfinished, the ends of the bar being provided with V-shaped notches extending across the bar, and a pair of spaced circular end members of non-ferrous-non-magnetic material cast in situ upon the ends of the ferrous magnetic bar for use in forming the end frames of the stator.

4. The method of manufacturing a stator including the steps of severing ferro-magnetic material adapted to form the pole pieces of the stator from a bar of ferro-magnetic material having marginally disposed parallel facets, forming notched dove-tailed tenons in the ends of said severed ferro-magnetic material; copper plating said severed ferro-magnetic material, casting non-ferromagnetic disc-like castings one on each end of the severed ferro-magnetic material to embed the ends thereof, the castings having dovetailed slots surrounding said dovetailed tenons; one of the castings being provided with a sprue-like extension projecting outwardly from the casting; finishing a portion of the sprue-like extension so as to form a cylindrical surface concentric with the cylindrical surface of the finished stator; trimming the castings and the severed ferro-magnetic material to the proper outer diameter; drilling a hole through one of the castings and lengthwise for a distance extending through the entire length of the severed ferro-magnetic material, said hole having approximately the diameter between the pole pieces; reaming the hole to the desired diameter; forming a seat for a bearing in the other casting, and drilling a hole for the armature shaft in the center of said seat to thereby form a stator for an electric motor.

5. In a dynamoelectric machine, a stator assembly comprising a plurality of elongated equally spaced apart longitudinally disposed pole piece members defining a bore for the rotor of said machine, and a pair of end flange members formed of cast non-magnetic material respectively encasing the ends of said pole piece members and being integrally joined by said cast non-magnetic material filling the spaces between said pole piece members.

6. In a dynamoelectric machine, a stator assembly comprising a plurality of elongated equally spaced apart longitudinally disposed pole piece members defining a bore for the rotor of said machine, said pole piece members being respectively curved transversely to conform to said bore, and a pair of end flange members formed of cast non-magnetic material respectively encasing the ends of said pole piece members and being integrally joined by said cast non-magnetic material filling the spaces between said pole piece members.

7. In a dynamoelectric machine, a stator assembly comprising a plurality of elongated equally spaced apart longitudinally disposed pole piece members defining a bore for the rotor of said machine, and a pair of end flange members formed of cast non-magnetic material respectively encasing the ends of said pole piece members.

8. The method of manufacturing a stator for electrical apparatus having magnetic fields radially positioned with respect to an armature, comprising the steps of applying hardenable non-magnetic material to a body of pre-formed material having at least two opposed discrete magnetic portions to form a stator frame, said non-magnetic material extending from one end of said body in a sprue-like portion, finishing a portion of the sprue-like extension so as to form a cylindrical surface whose axis is the axis of the finished stator, and forming a hole in said pre-formed material concentric with the axis of the frame to magnetically separate the body and form the inner surfaces of at least two pole pieces.

9. The method of manufacturing a stator for electrical apparatus having magnetic fields radially positioned with respect to an armature, comprising the steps of applying hardenable non-magnetic material to a body of pre-formed material having at least two opposed discrete magnetic portions to form a stator frame having at least one flange portion, of non-magnetic material which permanently and rigidly holds said magnetic portions in spaced relationship at at least one of their ends, and forming a hole concentric with the axis of the frame and through said flange portion to simultaneously magnetically separate the magnetic body into at least two discrete pole pieces forming pole faces on the inner surfaces thereof and also to locate a bearing seat for an armature shaft in said flange portion.

10. The method of manufacturing a stator for use in electrical apparatus having magnetic fields radially positioned with respect to an armature, said method including the steps of preforming a body including ferro-magnetic material with inter-engaging edges at at least two opposed discrete portions to provide pole stock, casting hardenable non-magnetic material around said pole stock while it is fixedly positioned so as to embed the inter-engaging edges of the pole stock in the non-magnetic material to form a stator frame having at least one end flange portion, and removing a central portion of the pole stock and flange to provide magnetically separated poles physically interconnected by the cast material, and to provide a cavity for receiving the armature.

11. The method of manufacturing a stator for use in electrical apparatus having magnetic fields radially positioned with respect to an armature, said method including the steps of preforming a bar of ferro-magnetic material with inter-engaging edges, plating the bar with a metal having rust-resisting properties, severing a portion of said bar to provide pole stock, casting hardenable non-magnetic material around said pole stock while it is fixedly positioned so as to embed the inter-engaging edges of the pole stock in the non-magnetic material to form a stator frame having at least one end flange portion, and removing a central portion of the pole stock and flange to provide magnetically separated poles physically interconnected by the cast material, and to provide a cavity for receiving the armature.

12. The method of claim 11 wherein the plating metal is adapted to bond aluminum to ferro-magnetic material and the non-magnetic material is aluminum.

13. The method of manufacturing a stator for use in electrical apparatus having magnetic fields radially positioned with respect to an armature, said method including the steps of pre-forming a stack of laminations of ferro-magnetic material having aligned apertures to provide pole stock, casting hardenable non-magnetic material around said pole stock while it is fixedly positioned so as to embed the pole stock in the non-magnetic material to form a stator frame, said non-magnetic material extending from one end of said body in a sprue-like portion, finishing a portion of the sprue-like extension so as to form a cylindrical surface whose axis is the axis of the finished stator, and removing a central portion of the pole stock to provide magnetically separated poles physically interconnected by the cast material, and to provide a cavity for receiving the armature.

14. The method of manufacturing a stator for use in electrical apparatus having magnetic fields radially positioned with respect to an armature, said method including the steps of pre-forming a bar of ferro-magnetic material, metal plating the bar, severing a portion of said bar to provide pole stock, casting hardenable non-magnetic material around said pole stock while it is fixedly positioned so as to embed the pole stock in the non-magnetic material to form a stator frame, said plating metal having the property of bonding the casting material to the ferro-magnetic material, said non-magnetic material extending from one end of said body in a sprue-like portion, finishing a portion of the sprue-like extension so as to form a cylindrical surface whose axis is the axis of the finished stator, and removing a central portion of the pole stock to provide magnetically separated poles physically interconnected by the cast material, and to provide a cavity for receiving the armature.

15. The method of manufacturing a stator for use in electrical apparatus having magnetic fields radially positioned with respect to an armature, said method including the steps of pre-forming a bar of ferro-magnetic material with inter-engaging edges, severing a portion of said bar to provide pole stock, assembling at least one pair of permanent magnets to said pole stock, casting hardenable non-magnetic material around said pole stock-magnets assembly while said assemly is fixedly positioned so as to embed it in the non-magnetic material to form a stator frame, said non-magnetic material extending from one end of said body in a sprue-like portion, finishing a portion of the sprue-like extension so as to form a cylindrical surface whose axis is the axis of the finished stator, and removing a central portion of the assembly to provide magnetically separated poles physically interconnected by the cast material, and to provide a cavity for receiving the armature.

16. The method of manufacturing a stator for electrical apparatus having magnetic fields radially positioned with respect to an armature, comprising the steps of applying hardenable non-magnetic material to a generally rectangular and flat body of pre-formed magnetic material to form a stator frame having two flange portions, a flange portion attached at each end of the ferro-magnetic body to form the stator frame; one of the flange portions being provided with a sprue-like extension, a portion of which is finished to form a cylindrical surface concentric with the edges of the body of ferro-magnetic material, and forming a hole concentric with the axis of the frame and through said ferro-magnetic body to magnetically separate the magnetic body into at least two pole pieces forming pole faces on the inner surfaces thereof.

17. The method of claim 16 including the step of trimming the outer diameter of the ferro-magnetic body and the flanges while using the finished cylindrical surface as a reference surface.

18. The method of claim 17 wherein said hole is formed simultaneously with the trimming of the outer diameter of the stator, said hole extending through one of said flange portions.

19. The method of claim 18 including the step of forming a recess in said other flange to provide a seat for a bearing for the armature shaft.

20. The method of claim 19 wherein said hole is formed completely through said other flange to permit the armature shaft to project therethrough.

References Cited in the file of this patent

UNITED STATES PATENTS

| | | |
|---|---|---|
| 1,233,764 | Dunham | July 17, 1917 |
| 1,535,330 | Mills | Apr. 28, 1925 |
| 1,991,046 | Bohli | Feb. 12, 1935 |
| 2,048,161 | Klaiber | July 21, 1936 |
| 2,060,260 | Spengler | Nov. 10, 1936 |
| 2,091,190 | Tognola | Aug. 24, 1937 |
| 2,109,992 | French | Mar. 1, 1938 |
| 2,267,342 | Schwartz et al. | Dec. 23, 1941 |
| 2,304,607 | Sleeter | Dec. 8, 1942 |
| 2,330,757 | Stout | Sept. 28, 1943 |
| 2,385,578 | Kaschke | Sept. 25, 1945 |
| 2,455,864 | Hanna | Dec. 7, 1948 |
| 2,479,455 | Aronoff | Aug. 16, 1949 |
| 2,607,816 | Ryder et al. | Aug. 19, 1952 |
| 2,668,925 | Bloser | Feb. 9, 1954 |
| 2,674,784 | Roberts et al. | Apr. 13, 1954 |
| 2,683,826 | Staak | July 13, 1954 |
| 2,711,008 | Smith | June 21, 1955 |
| 2,746,143 | Maine | May 22, 1956 |